Figure 1:
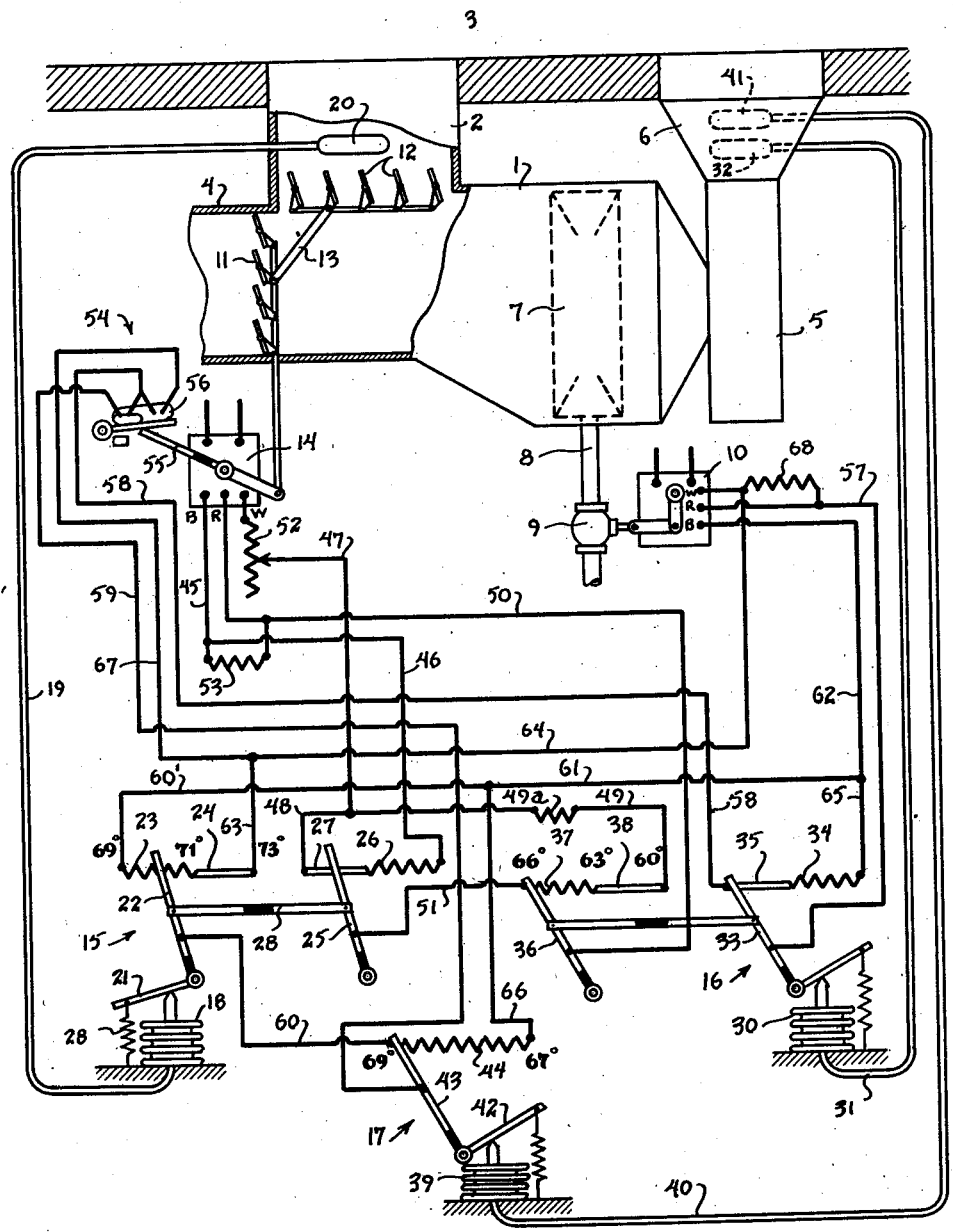

Jan. 6, 1942.  W. L. McGRATH  2,269,280
AIR CONDITIONING SYSTEM
Filed July 25, 1938  2 Sheets-Sheet 2

Inventor
William L. McGrath
By George H. Fisher
Attorney

Patented Jan. 6, 1942

2,269,280

UNITED STATES PATENT OFFICE 2,269,280

AIR CONDITIONING SYSTEM

William L. McGrath, St. Paul, Minn., assignor to Minneapolis-Honeywell Regulator Company, Minneapolis, Minn., a corporation of Delaware Application July 25, 1938, Serial No. 221,066

21 Claims. (Cl. 236—37)

This invention relates in general to air conditioning and more particularly to automatic controls for controlling the operation of air conditioning apparatus and the supply of fresh air to a space being conditioned.

In air conditioning practice it has been customary to provide for automatically supplying fresh outside air to a space when the space requires cooling, and when the fresh air temperature is at a value which is suitable for cooling the space. In providing for cooling the space in this manner it is necessary to control the amount of outside air supplied in order to prevent the temperature of the air being discharged into the space from becoming too low, due to the outside air being relatively low in temperature. One form of control arrangement for limiting the amount of fresh air supplied is by means of a thermostat located in the mixing chamber for the fresh and return air. This location for the thermostat however is not satisfactory in the average installation for the reason that there is usually no point in the mixing chamber in which the thermostat may be located to give a true indication of the average temperature of the mixture of fresh and return air. Due to stratification of the air within the mixing chamber, the temperature of the air contacting the thermostat will vary considerably, which causes the control apparatus to hunt and to operate unsatisfactorily in supplying air to the space at the desired value. In order to avoid the disadvantage of locating the controlling thermostat in the mixing chamber, in some cases the thermostat has been located so as to respond only to the temperature of the fresh air. This arrangement also has not proved to be entirely satisfactory due to the fact that the supply of fresh air is not entirely dependent upon the damper position but also is dependent upon wind velocity and direction. Thus for varying wind velocities this location of the thermostat will allow the discharge temperature to vary correspondingly.

It is an object of this invention to provide a fresh air damper control arrangement which will positively control the proportions of fresh and return air in a manner to maintain the temperature of the discharge air at the desired value for cooling the space. This result is obtained by locating the thermostat for the dampers in the discharge duct leading to the space to be conditioned, thereby measuring the temperature of the air actually being supplied to the space. This thermostat is prevented from being influenced by the usual heating coil by an interlocking arrangement which places this heating coil out of operation before the fresh air damper is opened beyond its minimum position.

It is therefore an object of this invention to provide a fresh air damper control arrangement which varies the position of the dampers in a manner to prevent the temperature of the air being discharged to the space from falling below a predetermined value, and which is interlocked with the control for the air conditioning apparatus in a manner normally to place this apparatus out of operation before more than the minimum supply of fresh air is admitted to the space.

Another object of this invention is the provision of an air conditioning control system in which the air conditioning apparatus is controlled conjointly by a space condition responsive device and by a discharge air condition responsive limit control, and in which the action of the limit control is varied in accordance with variations in the space condition being controlled.

More specifically it is an object of this invention to provide a heating control system in which the heating device is controlled by a space thermostat, and a discharge limit control, and in which the discharge limit control is influenced in a manner to maintain the discharge temperature at a relatively high value when the space is not overheated, while maintaining the discharge temperature at a lower value when the space is overheated.

A further object of this invention is the provision of an air conditioning control system which controls the air conditioning apparatus and the admission of fresh air to the space in a manner to maintain only a minimum supply of fresh air for ventilation purposes when the condition of the space requires operation of the air conditioning apparatus, which operates to maintain the air conditioning apparatus out of operation and to vary the supply of fresh air in a manner to maintain desired conditions within the space when operation of the conditioning apparatus is not required, and which automatically replaces the air conditioning apparatus into operation in the event that the condition of the air discharged into the space deviates from predetermined value.

Other objects of this invention will become apparent from the following description and appended claims.

Figure 2:
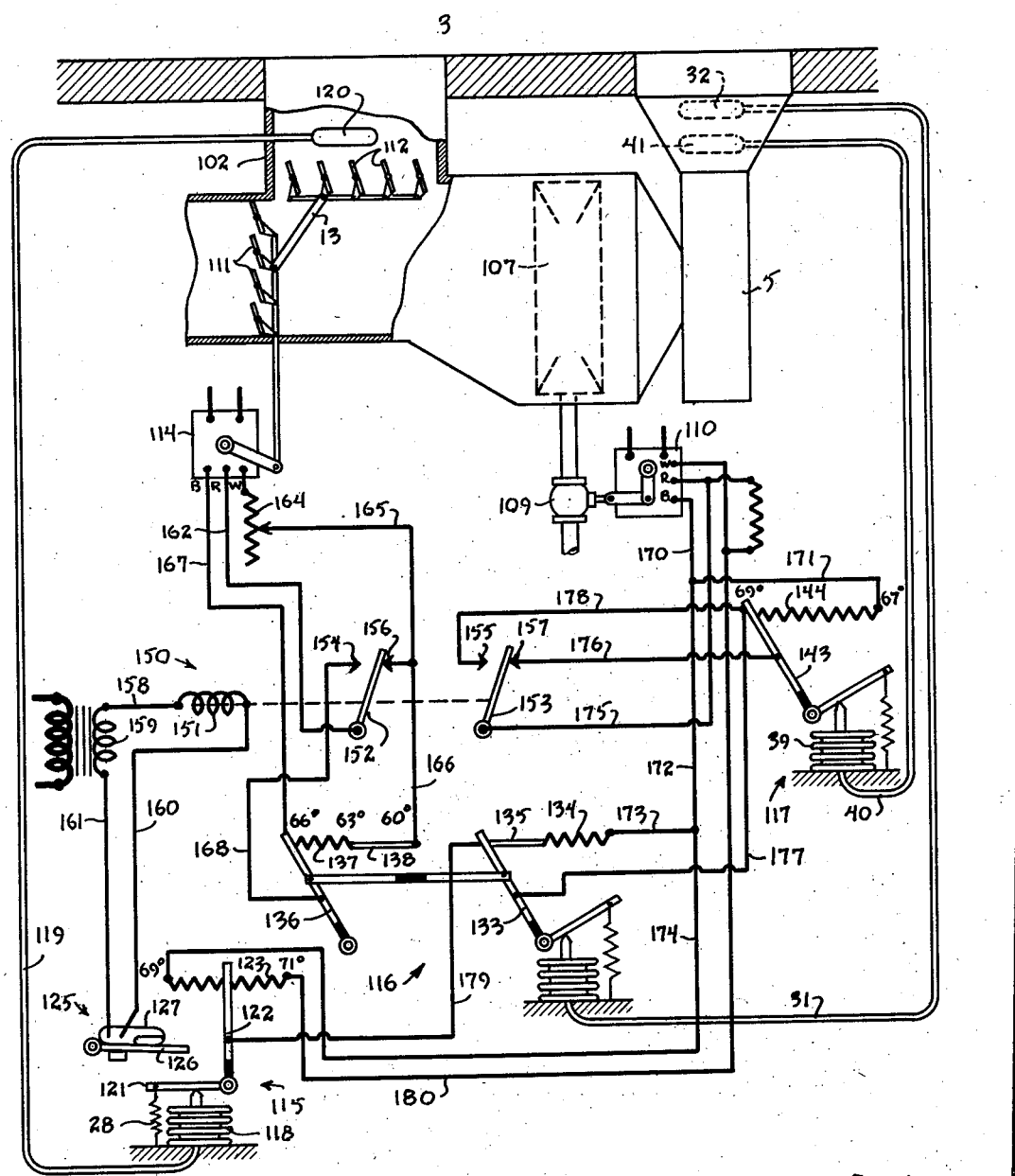

For a full disclosure of my invention reference is made to the following detailed description and to the accompanying drawings in which Figure 1 illustrates diagrammatically one form of my invention, and in which Figure 2 illustrates diagrammatically modification.

Referring to the drawings reference character 1 indicates an air condition or heating chamber having a return air duct 2 which conveys air from the space to be heated to the chamber 1. This chamber 1 is also connected to a fresh air inlet duct 4. The discharge end of chamber 1 is connected to a fan 5 which in turn is connected to discharge air into the space 3 through a discharge duct 6. Located within the chamber 1 is a heating coil 7 which may be of any suitable type. This coil 7 is connected to a heating medium supply pipe 8 having a control valve 9 interposed therein. The valve 9 is actuated by means of a proportioning motor 10 which may be of the type shown and described in the Taylor Patent 2,028,110 issued January 14, 1936. The proportions of fresh and return air supplied to the chamber 1 are controlled by means of a fresh air damper 11 and a return air damper 12. These dampers are of usual form and are cross connected by a link 13 in a manner to cause simultaneous movement of these dampers in opposite manners. These dampers are actuated through any suitable linkage by means of a proportioning motor 14 which also may be of the type disclosed in the Taylor patent. The proportioning motors 10 and 14 are controlled by means of a return air controller 15 and discharge air controllers 16 and 17.

Referring to the return air controller 15, this controller may be of any desired type and is illustrated diagrammatically as including a bellows 18 which is connected by a capillary tube 19 to a control bulb 20 located in the return air duct 2. The bellows 18 may actuate a bell crank member including an actuating arm 21 and a slider 22 which cooperates with a resistance 23 and a contact strip 24 for forming a control potentiometer. This controller also includes a slider 25 which cooperates with a resistance 26 and a contact strip 27 for forming a second control potentiometer. This slider 25 is actuated in unison with the slider 22 by the bellows 18 in any suitable manner such as by an insulated link 28. The actuating arm 21 of this controller is biased against the bellows 18 by means of a spring 28 for thus causing movement of the sliders 22 and 25 to the left upon contraction of bellows 18 due to fall in temperature at control bulb 20. It will be understood that as the return air temperature increases the pressure within bellows 18 will increase for causing movement of sliders 22 and 25 to the right against the action of spring 28. This instrument may be so designed and adjusted as to cause the slider 22 to engage the left hand end of resistance 23 and the slider 25 to engage the left hand end of contact strip 27 when the space temperature is at 69° F. or below. As the space temperature increases above 69° F. the slider 22 will move to the right along resistance 23 while the slider 25 will slide along contact strip 27. When the return air temperature reaches 71° F. the slider 22 will engage the right hand end of resistance 23 and the slider 25 will engage the left hand end of resistance 26. Upon further increase in temperature, the slider 22 will slide along contact strip 24 while the slider 25 will slide along resistance 26 and will engage the right hand end of this resistance when the return air temperature rises to 73° F.

Referring to the discharge controller 16 this controller may be similar to the return air controller 15 and includes a bellows 30 which is connected by a capillary tube 31 to a control bulb 32 located in the discharge duct 6. This bellows 30 actuates a slider 33 which cooperates with resistance 34 and contact strip 35 to form a first control potentiometer, and also actuates a slider 36 which cooperates with resistance 37 and contact strip 38 to form a second control potentiometer. This instrument may be so designed and adjusted as to cause the slider 36 to engage the left hand end of resistance 37 when the discharge air temperature is at 66° F. or above. At this time the slider 33 will engage the left hand end of contact strip 35. As the discharge air temperature falls between 66° F. and 63° F. the slider 36 will move to the right along resistance 37 and the slider 33 will move to the right along contact strip 35. When the discharge air temperature falls to 63° F. the slider 36 will engage the right hand end of resistance 37 and the slider 33 will engage the left hand end of resistance 34. Upon decrease in temperature below 63° F. the slider 36 will engage the left hand end of contact strip 38 and the slider 33 will engage the left hand end of resistance 34. Upon decrease in temperature below 63° F. the slider 33 will move to the right along resistance 34 and will engage the extreme right hand end of this resistance when the discharge temperature falls to 60° F.

The discharge controller 17 includes a bellows 39 which is connected by a capillary tube 40 to a control bulb 41 located in discharge duct 6. This bellows 39 actuates a bell crank lever including an actuating arm 42 and a slider 43 which cooperates with a resistance 44 for forming a control potentiometer. This instrument may be designed and adjusted in a manner to cause the slider 43 to engage the left hand end of resistance 44 when the discharge temperature is at or above 69° F. As the discharge temperature falls below 69° F. the slider 43 will move to the right along resistance 44 and will engage the right hand end of this resistance when the discharge temperature falls to 67° F.

Upon reference to the Taylor patent it will be found that the proportioning motor 14 is adapted to assume intermediate positions in accordance with variations in resistance applied to the motor control circuit. This motor includes a three-wire control circuit and is provided with control terminals marked R, W, and B. When equal values of resistance are connected across terminals R and W and terminals R and B this motor will assume mid position. However, if the resistance between terminals R and W is decreased without corresponding decrease in resistance across terminals R and B, the motor will rotate in a manner to close fresh air damper 11 and open return air damper 12 an amount proportionate to the change in resistance. Also if the resistance between terminals R and B is decreased without corresponding decrease in resistance connected across terminals R and W, the motor will rotate in the opposite direction for opening fresh air damper 11 and closing return air damper 12 an amount proportionate to the change in resistance.

Referring now to the wiring between motor 14 and the controllers 15 and 16 it will be noted that terminal B is connected by wires 45 and 46 to the right hand end of resistance 26, while terminal W is connected to the contact strips 27 and 38 by means of wires 47, 48, and 49. Terminal R is connected by wire 50 to the slider 36, and the left hand end of resistance 37 is connected to slider 25 by means of wire 51. With the controllers 15 and 16 in the positions shown the space temperature is at 70° as indicated by the slider 25 engaging the center of contact strip 27, and the discharge temperature is above 66° F. as indicated by slider 36 engaging the left hand end of resistance 37. With the controllers 25 and 36 in the positions shown a circuit is completed from terminal R through wire 50, slider 36, wire 51, slider 25, contact strip 27, wire 48, wire 47, and rheostat 52 to terminal W. Thus except for the resistance of rheostat 52, a short-circuit is completed between terminals R and W. This substantial short-circuit between terminals R and W without corresponding short-circuit between terminals R and B has caused the motor 14 to assume a position in which the fresh air damper 11 is almost closed and in which return air damper 12 is almost wide open. The setting of the rheostat 52 now determines the amount of resistance between terminals R and W and therefore provides an adjustment for varying the minimum amount of fresh air supplied to the space. Thus as rheostat 52 is adjusted for decreasing its resistance, the motor 14 will rotate for closing damper 11 further and will completely close this damper when the rheostat 52 is adjusted for zero resistance. By adjusting rheostat 52 any desired minimum fresh air supply may be provided.

If the space temperature begins rising above 71° F. the slider 25 will begin moving to the right across resistance 26. This will insert a portion of the resistance 26 into the circuit between terminals R and W and will also decrease the portion of the resistance 26 which is connected between terminals R and B by means of wires 45 and 46. Due to this increasing of the resistance between terminals R and W and decreasing of the resistance between terminals R and B, the motor 14 will rotate in a direction for opening damper 11 an amount proportionate to the movement of slider 45 along with resistance 26. When the space temperature rises to 73° F. the slider 25 will engage the right hand end of resistance 26 which will complete a circuit from terminal R, wire 50, slider 36, wire 51, slider 25, and wires 46 and 45 to terminal B, thus establishing a short-circuit between terminals R and B. At this time the entire resistance 26 will be connected between the slider 25 and terminal W. This short-circuit of terminals R and B and insertion of resistance 26 between terminals R and W will cause the motor 14 to move to its extreme position for opening the fresh air damper 11 wide and closing the return air damper 12 completely. From the description thus far it should be apparent that when the discharge temperature is above 66° F. the thermostat 15 will vary the position of the dampers 11 and 12 in accordance with variations in return air or space temperature, the fresh air damper 11 being closed to its minimum position when space temperature is at or below 71° F. As the space temperature increases above 71° F. however the fresh air damper is opened and reaches wide open position when the space temperature rises to 73° F.

As pointed out above when the return air temperature is above 73° F. and the discharge air temperature is above 66° F. a short-circuit is completed from terminal R through wire 50, slider 36, wire 51, slider 25, and wires 46 and 45 to terminal B. At this time the entire resistance 37 is connected across terminals R and W as follows: terminal R, wire 50, slider 36, resistance 37, contact strip 38, wire 49, wire 47, and rheostat 52 to terminal W. In the event that the discharge air temperature should begin falling below 66° F. due to the damper 11 being opened by thermostat 15, the slider 36 will move to the right across resistance 37 thus inserting a portion of this resistance into the circuit between terminals R and B and decreasing the portion of this resistance which is connected between terminals R and W. This increasing of resistance between terminals R and B and decreasing of resistance between terminals R and W will cause the motor 14 to rotate in a direction for closing fresh air damper 11 and opening return air damper 12 an amount proportionate to the movement of slider 36 on resistance 37. When the discharge temperature falls to 63° F. the entire resistance 37 will be connected between terminals R and B, and terminals R and W will be substantially short-circuited except for the resistance 49a interposed in wire 49 for causing the fresh air damper 11 to assume substantially its minimum position. The purpose of resistance 49a is to prevent the damper 11 from being rotated completely to its minimum position by thermostat 16. The object of the arrangement will become apparent as this description proceeds.

From the foregoing description it should be apparent that when either the space temperature is below 71° F. or the discharge temperature is below 63° F. the fresh air damper 11 will assume its minimum position for supplying no more fresh air than is necessary for ventilation. However, if the space temperature should rise above 71° F. thus indicating that cooling is necessary the fresh air damper 11 will open an amount proportionate to the rise in space temperature above 71° F., thus admitting additional fresh air for cooling the space. If this increase in supply of fresh air should result in the discharge temperature falling below 66° F. the controller 16 will act to cause closing of the damper 11 an amount sufficient for preventing the temperature of the discharged air from falling too low, thus avoiding cold drafts upon the occupants within the space.

It should be noted that a resistance 53 is connected across wires 45 and 50, the purpose of this resistance is to balance out the control circuit for motor 14. This resistance should be of the same values as the control resistances 26 and 37.

Referring now to the controls for the steam valve proportioning motor 10 this motor is controlled by the conjoint action of the return air thermostat 15, the discharge air thermostats 16 and 17, and by means of an auxiliary switch 54 which is actuated by the fresh air damper motor 14. This auxiliary switch 54 is illustrated as diagrammatically comprising a lever 55 which actuates a mercury switch 56, this lever being actuated by the proportioning motor shaft. When the fresh air damper 11 assumes its normal minimum position the lever 55 will engage switch 56 for tilting it to bridge its left hand electrodes, while when the fresh air damper 11 is away from the minimum position, the switch 56 will be tilted for bridging its right hand electrodes.

With the controllers 16 and 17 and the fresh air dampers 11 in the positions shown, terminal R of motor 10 will be directly connected to the slider 22 of the return air thermostat 15 as follows: terminal R, wire 57, slider 33, wire 58, left hand electrodes of mercury switch 54, wire 59, slider 43, and wire 60 to slider 22. The left hand end of the resistance 23 it will be noted is connected by wires 60', 61, and 62 to terminal B of motor 10 while the contact strip 24 is connected by wires 63 and 64 to terminal W of motor 10. It should also be noted that the resistance 34 is connected by wires 65 and 62 to terminal B. Consequently the entire resistance 34 at this time is connected across terminals R and B of motor 10. Also the right hand end of resistance 44 is connected by wires 66, 61, and 62 to terminal B thus placing this entire resistance between terminals R and B of motor 10. Thus with the controllers 16, 17, and 54 in the positions shown resistances 34 and 44 are connected across terminals R and B in parallel. In order to balance out the system an additional resistance 68 is connected across terminals R and W as shown. This resistance should be equivalent to the parallel connected resistances 34 and 44.

As pointed out above with these controllers in the positions shown terminal R of motor 10 is directly connected to the slider 22 of the return air controller 15 while the resistance 23 is connected by wires 60', 61, and 62 to terminal B, and contact strip 24 is connected by wires 63 and 64 to terminal W. The slider 22 therefore acts at this time to vary the portions of resistance 23 which are connected across terminals R and W and terminals R and B. With controller 15 in the position shown the space temperature is at approximately 70° and the slider 22 is engaging the center of resistance 23. This causes the resistance 23 to be equally divided between terminals R and W and terminals R and B thus causing the proportioning motor 10 to assume mid position in which the valve 9 is half open. If the space temperature should decrease the slider 22 will move to the left across resistance 23 thus decreasing the portion of this resistance which is connected between terminals R and B and increasing the portion of this resistance which is connected between terminals R and W. This will cause the proportioning motor 10 to rotate in a direction for opening valve 9 an amount proportionate to the fall in space temperature. Upon an increase in space temperature the slider 22 will move to the right across resistance 23 for decreasing the portion of resistance 23 connected between terminals R and W and increasing the portion of this resistance which is connected between terminals R and B, thus causing motor 10 to rotate in a direction for decreasing the supply of heating medium to the heater 7.

During mild weather the internal heat gain within the space 3 may cause the space temperature to rise sufficiently for causing thermostat 15 to close valve 9 to such a point that the temperature of the air being discharged into the space falls below the setting of the discharge thermostat 17. In such event the slider 43 will begin moving to the right across the resistance 44 thus inserting a portion of this resistance 44 into circuit with the slider 22 of controller 15. This will also decrease the portion of resistance 44 which is connected between terminals R and B due to the fact that the right hand end of resistance 44 is connected to terminal B by wires 66, 61, and 62. This increasing of resistance between terminals R and W and decreasing of resistance between terminals R and B will cause the motor 10 to operate in a direction for opening valve 9 an amount proportionate to the movement of slider 43 on resistance 44. From the description thus far it should be apparent that when the space temperature is below 71° F. the fresh air damper 11 will be closed to its minimum position thus admitting only a minimum amount of fresh air for ventilation purposes. This will cause the mercury switch 56 to be tilted for bridging its left hand electrodes as shown for completing the circuit from terminal R to the slider 43 of controller 17, thus placing the valve motor 10 under the control of the return air controller 15 and the discharge low limit controller 17. Thus when the space temperature is below 71° F. only a minimum amount of fresh air is supplied to the space and the supply of heat to the heater 7 is controlled in accordance with space temperature by the thermostat 15 and the discharge temperature is prevented from falling below 67° F. by means of the low limit controller 17.

In the event that space temperature should become excessive due to mild weather or due to a large heat gain within the space being heated, the sliders 22 and 25 of the thermostat 15 will move to the right for causing the slider 25 to engage resistance 26 and the slider 22 to engage contact strip 24. At this time the fresh air damper 11 will remain at its minimum position due to the slider 25 merely engaging the left hand end of resistance 26. Due to the slider 22 engaging the contact strip 24, the thermostat 15 will tend to maintain the valve 9 closed, and the closing movement of valve 9 will be now controlled entirely by the low limit discharge thermostat 17. This thermostat will act to maintain the discharge temperature at approximately 68° F.

Upon continued rise in space temperature, the slider 25 of thermostat 15 will begin sliding to the right across resistance 26 which will cause movement of the fresh air damper 11 away from its minimum position thus increasing the flow of cool outside air into the space being conditioned. When the damper 11 is moved away from its minimum position, the mercury switch 56 will be tripped for breaking the circuit through its left hand electrodes and completing a circuit through its right hand electrodes. This will cause terminal R of motor 10 to be directly connected to terminal W as follows: terminal R, wire 57, slider 33, contact strip 35, wire 58, right hand electrodes of switch 56, wire 67, and wire 64 to terminal W. Due to the unbridging of the left hand electrodes of mercury switch 56, the circuit from terminal R of the motor to the slider 43 of thermostat 17 will be broken. Therefore the tilting of mercury switch 56 for bridging its right hand electrodes closes the valve 9 and disconnects the low limit thermostat 17 from the valve motor circuit for preventing this thermostat from tending to open said valve. Thus when the fresh air damper 11 is opened due to overheating within the space, the valve 9 will be closed for placing the heater 7 out of operation. At this time the fresh air damper 11 will be positioned in accordance with space temperature and its opening movement will be limited by the low limit thermostat 16 in a manner to prevent the temperature of the air being discharged into the space from falling too low. When the space temperature rises to 73° F., or above, the thermostat 15 will tend to cause fresh air damper 11 to be wide open. At such time the damper 11 will be completely under the control of the low limit thermostat 16 which will maintain the temperature of the air being discharged into the space between 63° F. and 66° F. If the overheating occurs during relatively mild weather it will take a considerable amount of fresh air in order to reduce the mixture of fresh and return air to a value within the control range of slider 36 and resistance 37 of thermostat 16. As the outdoor temperature becomes colder a smaller proportion of fresh air will be necessary for cooling the discharge air to the desired value and the thermostat 16 will cause damper 11 to close to the proper position for maintaining the desired discharge temperature. If overheating occurs during relatively cold weather, the mixture of fresh and return air may fall to 63° F. which will cause the slider 36 to engage the right hand end of resistance 37 which will cause the damper motor 14 to close the fresh air damper 11 to substantially its minimum position for supplying the air necessary for ventilation. Due to the action of resistance 49a, the thermostat 16 will be incapable of closing damper 11 to a point for tripping the mercury switch 56 to bridge its left hand electrodes. Consequently at this time the switch 56 will remain in position for bridging its right hand electrodes which maintains the low limit thermostat 17 out of operation and consequently the valve 9 will remain closed.

In the event that the fresh air temperature is so low that it causes the mixture of the minimum supply of fresh air with the return air to fall below 63° F., the slider 33 of thermostat 16 will begin moving to the right along resistance 34. It will be noted that slider 33 is directly connected to terminal R by wire 57, and the right hand end of resistance 34 is connected to terminal B of motor 10 by wires 62 and 65. Thus when the slider 33 engages the left hand end of resistance 34 this entire resistance is connected between terminals R and B of the motor 10. However, as the slider 33 travels to the right across resistance 34, it interposes a portion of the resistance 34 into the short-circuit previously established between terminals R and W and decreases the portion of the resistance 34 which is connected between terminals R and B. This will cause opening of the valve 9 for thus preventing the discharge temperature from falling below the setting of the controller formed of slider 33 and resistance 34.

From the foregoing description it should be apparent that when the space temperature is between 69° F. and 71° F. the damper 11 will be closed to its minimum position for supplying only air necessary for ventilation and the position of valve 9 will be controlled by the space thermostat 15 and the low limit discharge thermostat 17 in a manner to prevent the space temperature from falling below the setting of thermostat 15 and to prevent the discharge temperature from falling below the setting of thermostat 17. However, when the space temperature rises above the setting of the control range of the first potentiometer of thermostat 15, the second potentiometer of this thermostat will cause opening of the fresh air damper 11 beyond its minimum position which will immediately trip the mercury switch 56 for placing the low limit controller 17 out of operation and maintain the valve 9 completely closed. At this time the opening movement of the damper 11 will be determined by the second potentiometer of the thermostat 15 for supplying the necessary amount of cold outside air to the space for cooling the space, and the opening movement of damper 11 will be limited by the thermostat 16 in a manner to prevent the discharge temperature from falling to a value which would cause cold drafts within the space. In the event that the overheating occurs in relatively cold weather, the mixture of the minimum air supply for ventilation with the return air may cause the discharge temperature to fall to a point requiring heating in order to prevent cold drafts within the space. If this happens the second potentiometer of thermostat 16 will cause opening of the valve the proper amount for maintaining the discharge temperature at a proper value. Thus when the system is in normal operation only a minimum amount of fresh air for ventilation is supplied and the discharge temperature is maintained relatively high by discharge thermostat 17. However, when the space becomes overheated the air for cooling the space is supplied and the thermostat 17 is placed out of operation for thus permitting the discharge temperature to be lowered for cooling the space. However, if the discharge temperature falls too low the thermostat 16 causes reopening of the valve 9 for thus preventing cold drafts to be caused within the space. It will therefore be seen that when the space temperature is at a proper value the discharge temperature is prevented from falling below a relatively high value, while when the space temperature becomes too high, the low limit discharge control apparatus is influenced for permitting the discharge temperature to fall to a lower value. In other words, the setting of the low limit discharge control apparatus is lowered when the space temperature becomes too high.

*Figure 2*

Referring now to Figure 2, this figure shows a modified form of control system for obtaining the same results as the system of Figure 1. In this figure the supply of heating medium to the heating coil 107 is controlled by a valve 109 positioned by a proportioning motor 110. Also the dampers 111 and 112 are positioned by means of a proportioning motor 114. These motors 110 and 114 are controlled by means of a space thermostat 115, a discharge thermostat 116, and a discharge thermostat 117.

The return air or space thermostat 115 comprises a bellows 118 which is connected by a capillary tube 119 to a control bulb 120 located in the return air duct 102. This bellows actuates a bell crank lever including an actuating arm 121 and a slider 122 which cooperates with the resistance 123. This instrument may be so designed and adjusted as to cause the slider 122 to engage the left hand end of resistance 123 when the space temperature falls to 69° F. When the space temperature increases to 71° F. the slider 122 will engage the right hand end resistance 71. This controller 115 also includes an auxiliary switch 125. This switch 125 is illustrated diagrammatically as including a pivoted switch carrier 126 upon which is mounted a mercury switch 127. The switch carrier 126 is actuated by the actuating arm 121 in a manner to permit switch 127 to be tilted to open position whenever the space temperature is below 71° F. However, when the space temperature rises to 71° F. the slider 122 will engage the right hand end of resistance 123, and the actuating arm 121 will engage switch carrier 126 for tilting the mercury switch 127 to closed position.

The discharge controller 116 is exactly the same as the discharge controller 16 of Figure 1. This controller includes a slider 136 which cooperates with resistance 137 and contact strip 138 for forming a first control potentiometer, and slider 133 which cooperates with resistance 134 and contact strip 135 for forming a second control potentiometer. The discharge controller 117 is exactly the same as the discharge controller 17 of Figure 1 and includes a slider 143 which cooperates with a resistance 144.

The auxiliary switch 127 of thermostat 115 controls a relay 150 which consists of a relay coil 151 which causes actuation of switch arms 152 and 153 which cooperate with "in" contacts 154 and 155 and with "out" contacts 156 and 157. The left hand end of relay coil 151 is connected by a wire 158 to a transformer secondary 159, while the right hand end of coil 151 is connected by wire 160 to the mercury switch 127. This mercury switch is also connected by wire 161 to the transformer secondary 159. Thus when the mercury switch 127 is closed due to the space temperature reaching 71° F., the relay coil 151 will be energized for causing switch arms 152 and 153 to engage "in" contacts 154 and 155. When the space temperature is below 71° F. the mercury switch 127 is tilted to open position for deenergizing relay coil 151 which permits switch arms 152 and 153 to engage "out" contacts 156 and 157.

Referring now to the wiring for motor 114, terminal R of this motor is connected by wire 162 to the switch arm 152 of relay 150. Terminal W of motor R is connected through rheostat 164 and wire 165 to contact 156 of relay 150 and also by wire 166 to the contact strip 138 of thermostat 116. The resistance 137 of this thermostat is directly connected to terminal B of motor 114 by wire 167. The contact 154 of relay 150 is connected by wire 168 to the slider 136 of thermostat 116.

When the space temperature is below 71° F. for causing the relay 150 to be deenergized, the switch arm 152 will engage contact 156 as shown which will complete a circuit from terminal R of motor 114 through wire 162, switch arm 152, contact 156, wire 165, and rheostat 164 to terminal W. This will therefore short-circuit terminals R and W except for the minimum position rheostat 164, and therefore will cause the motor 114 to close fresh air damper to a minimum position as determined by the setting of rheostat 164. Therefore when the space temperature is below 71° F. the fresh air damper is caused to be closed to its minimum position by the action of the auxiliary switch 125. However, if the return air or space temperature rises above 71° F. the auxiliary switch 125 will energize relay 150 for causing switch arm 152 to engage contact 154. This will complete a circuit from terminal R of the motor through wire 162, switch arm 152, contact 154, and wire 168 to the slider 136 of thermostat 116. Due to switch arm 152 no longer engaging contact 156 the short-circuit previously established between terminals R and W will be broken and consequently the thermostat 116 will be placed in control of the damper motor 114. This thermostat 116 will now control the damper 111 in the same manner as the thermostat 16 of Figure 1 controls the damper 11. In other words, when the discharge temperature is at 66° F. or above, the thermostat 116 will cause the damper 111 to be wide open. However, as the discharge temperature falls, the thermostat 116 will cause throttling of damper 111 in a manner to maintain the discharge temperature within the control range of this thermostat.

Referring now to the controls for the valve motor 110 it will be noted that terminal B of this motor is connected by wires 170, 171, 172, 173, and 174 to the right hand end of resistance 144, to the right hand end of resistance 134, and to the left hand end of resistance 123. Terminal R of this motor is connected by wire 175 to the switch arm 153 and the contact 157 is connected by wire 176 to the slider 143 of thermostat 117. The left hand end of resistance 144 is connected by wire 177 to the slider 133 of thermostat 116 and is also connected by wire 178 to the contact 155 of relay 150. The contact strip 135 of thermostat 116 is connected by wire 179 to the slider 122 of the thermostat 115. When the relay 150 is deenergized and the discharge temperature is above 69° F. terminal R of motor 110 will be directly connected to slider 122 of thermostat 115 as follows: terminal R, wire 175, switch arm 153, contact 157, wire 176, slider 143, wire 177, slider 133, and wire 179 to slider 122. The right hand end of resistance 123 of thermostat 115 is connected by wire 180 to terminal W of motor 110. Thus with the parts in the positions shown, the thermostat 115 is in complete control of the position assumed by the motor 110. If the space temperature should decrease, the slider 122 will shift to the left along resistance 123 thus decreasing the portion of this resistance which is connected between terminals R and B and increasing the portion of resistance 123 which is connected between terminals R and W, thus causing motor 110 to open valve 109 for increasing the supply of heating medium to coil 107. Upon an increase in space temperature the opposite action will occur for closing valve 109 to reduce the supply of heating medium to coil 107. In the event that the closing of valve 109 by thermostat 115 causes the discharge temperature to fall below the setting of the discharge thermostat 117, the slider 143 of this controller will begin moving to the right across resistance 144, thus inserting a portion of this resistance between terminal R of motor 110 and the slider 122, thermostat 115, and also decreasing the portion of this resistance which is connected between terminals R and B of motor 110 by wires 171 and 170. This will cause motor 110 to reopen valve 109 an amount sufficient to maintain the discharge temperature within the control range thermostat 117. From the description thus far it should be apparent that as long as the space temperature is below 71° F. the auxiliary switch 125 will be open which positions the relay 150 for placing the valve 110 under the control of the return air thermostat 115 and the discharge thermostat 117. These thermostats will now control valve 109 in a manner to prevent the space temperature from falling below the setting of thermostat 115 and the discharge temperature from falling below the setting of thermostat 117.

If the space temperature rises above 71° F. the auxiliary switch 125 of thermostat 115 will be closed for energizing relay 150 thereby bringing switch arm 153 into engagement with contact 155. Due to the switch arm 153 now being disengaged from contact 157, the connection between terminal R of motor 110 and the slider 143 of thermostat 117 will be broken and consequently this thermostat will be rendered inoperative to control motor 110. Due to engagement of switch arm 153 with contact 155, terminal R of motor 110 will now be connected by wire 175, switch arm 153, contact 155, wire 178, and wire 177 to the slider 133 of thermostat 116. As long as the discharge temperature is above 63° F. the slider 133 of thermostat 116 will engage the contact strip 135 which will complete the circuit from terminal R through wire 179, slider 122, and wire 180 to terminal W of motor 109 thus short-circuiting terminals R and W of this motor. This will cause motor 110 to close valve 109 completely. However, if the discharge temperature falls below 63° F. due to the outside air being cold, the slider 133 of thermostat 116 will begin traveling to the right across resistance 134. This resistance 134, it will be noted, is connected by wires 173, 172, and 170 to terminal B of motor 110. Thus as slider 133 travels to the right across resistance 134, it decreases the portion of resistance 134 which is connected between terminals R and B and also inserts a portion of resistance 134 into the short-circuit previously established between terminals R and W. Therefore motor 110 will be caused to open valve 109 an amount proportionate to the travel of slider 133 to the right across resistance 134.

Referring now to the operation of the complete system it should be noted that when the space temperature is below 71° F. the auxiliary switch 125 of thermostat 115 will be open for deenergizing relay 150. This deenergization of relay 150 will cause the damper motor 114 to close fresh air damper 111 to its minimum position, and will also render the discharge thermostat 117 operative to prevent the discharge temperature from falling below the setting of this thermostat. Thus when the return air temperature is below 71° F. only a minimum supply of fresh air for ventilation purposes will be provided, and the valve 109 will be controlled by thermostat 115 and thermostat 117 in a manner to prevent the space temperature from falling below the setting of thermostat 115 and the discharge temperature from falling below the setting of thermostat 117. However, when the space temperature rises above 71° F. the thermostat 115 will tend to close the valve 109 completely and will also cause closing of the auxiliary switch 125 which energizes relay 150 for placing the fresh air damper motor 114 under the control of discharge thermostat 116 and for rendering the discharge thermostat 117 incapable of opening valve 109 when the discharge temperature falls below the setting of this thermostat. The valve 109 will therefore be entirely closed and the damper 111 will be positioned by thermostat 116 in a manner to maintain the temperature of the air being discharged into the space between 66° F. and 63° F. In the event that the outside temperature is low when the overheating occurs, the mixture of the minimum supply of fresh air with the return air may cause the temperature of the air passing to the space to fall below 63° F. even though the thermostat 116 has positioned damper 111 to its minimum position. If this occurs the slider 133 of thermostat 116 in engaging the resistance 134 will reopen the valve 109 for thus adding heat to the air for preventing the discharge temperature from falling too low.

It will be apparent that both forms of my invention provide for automatic control of the fresh air damper and the heater for maintaining proper conditions within the space, and provide only the necessary air for ventilation when heating of the space is necessary, and in addition supply just the proper amount of outside air to the space for delivering air to the space at proper temperature to cool the space when cooling is required. In addition it will be apparent that both forms of my invention provide for maintaining the discharge temperature at a relatively high value as long as the space is not overheated and provide for lowering the temperature of the discharged air when the space becomes overheated. In other words, in both cases, the setting of the discharge temperature responsive means is lowered when the space becomes overheated. Also both forms of my invention provide for placing the heater in operation even when the space is overheated, in the event that outside temperature is so low as to cause the minimum supply of fresh air to overcool the air being discharged to the space.

While for the purpose of description specific values of temperature have been referred to, it will be understood that these values may be varied as desired for different applications and installations of my improved control system. Also while I have shown and described only two possible forms of my invention it will be apparent that many modifications and adaptations which are within the scope of my invention will occur to those skilled in the art. I therefore desired to be limited only by the scope of the appended claims.

I claim as my invention:

1. In an air conditioning system, in combination, means for supplying fresh air to a space to be conditioned, means for heating the supply of fresh air, a first motor for controlling the heating means, a flow controller for controlling the supply of fresh air, a second motor for actuating the flow controller, thermostatic means influenced by space temperature for controlling said first and second motors in a manner to reduce the supply of fresh air and to increase the effect of said heating means upon fall in space temperature, discharge thermostatic means influenced by the temperature of the air passing to said space for controlling said first motor conjointly with the space thermostatic means in a manner to prevent the temperature of the air passing to said space from falling below a predetermined value, and means actuated in accordance with said flow controller for lowering the setting of said discharge thermostatic means as the supply of fresh air is increased above a predetermined value.

2. In an air conditioning system, in combination, means for supplying fresh air to a space to be conditioned, means for heating the supply of fresh air, a first motor for controlling the heating means, a flow controller for controlling the supply of fresh air, a second motor for positioning said flow controller, thermostatic means influenced by space temperature for controlling first and second motors in a manner to reduce the supply of fresh air and to increase the effect of said heating means upon fall in space temperature, low limit discharge thermostatic means influenced by the temperature of the air passing to said space for controlling said first motor in a manner to increase the heating effect thereof independently of the space thermostatic means to thereby prevent the temperature of the air passing to said space from falling below a predetermined value, and means actuated upon the space temperature rising above a predetermined value for lowering the setting of said low limit discharge thermostatic means.

3. In an air conditioning system, in combination, means for supplying fresh air to a space to be conditioned, means for heating the supply of fresh air, a first motor for controlling the heating means, a flow controller for controlling the supply of fresh air, a second motor for positioning the flow controller, thermostatic means influenced by space temperature for controlling said first and second motors in a manner to reduce the supply of fresh air and to increase the effect of said heating means upon fall in space temperature, discharge temperature responsive means for cooperating in controlling said heating means and said flow controller in a manner to prevent the temperature of the air discharged to said space from falling below a predetermined value, and means actuated in accordance with said flow controller for rendering said discharge temperature responsive means substantially incapable of placing said heating means in operation when said flow controller is positioned for permitting a predetermined flow of fresh air to the space.

4. In an air conditioning system, in combination, means for supplying fresh air to a space to be conditioned, means for heating the supply of fresh air, a first motor for controlling the heating means, a flow controller for controlling the supply of fresh air, a second motor for positioning the flow controller, thermostatic means influenced by space temperature for controlling said first and second motors in a manner to reduce the supply of fresh air and to increase the effect of said heating means upon fall in space temperature, low limit discharge temperature responsive means for cooperating in controlling said heating means and said flow controller in a manner to prevent the temperature of the air discharged to said space from falling below a predetermined value, and means actuated upon space temperature reaching a predetermined high value for normally rendering said discharge temperature responsive means incapable of placing said heating means in substantial operation.

5. In an air conditioning system, in combination, means for supplying fresh air to a space to be conditioned, means for conditioning the supply of fresh air, a first motor for controlling said conditioning means, a flow controller for varying the supply of fresh air, a second motor for positioning the flow controller, thermostatic means for controlling said first motor in accordance with the condition of the space, low limit thermostatic means responsive to the temperature of the discharge air for cooperating in controlling said first motor in a manner to prevent the discharge air temperature from falling too low, and switching means actuated by said space thermostatic means for actuating said second motor to restrict the flow of fresh air and to place said discharge thermostatic means in control of said conditioning means when said switching means is in one position, and to permit actuation of said second motor for increasing the flow of fresh air while placing said discharge thermostatic means out of control of said first motor when said switching means is in another position.

6. In an air conditioning system, in combination, means for supplying fresh air to a space to be conditioned, means for conditioning the supply of fresh air, a first motor for controlling said conditioning means, a flow controller for varying the supply of fresh air, a second motor for positioning said flow controller, thermostatic means for controlling said first motor in accordance with the condition of the space, low limit thermostatic means responsive to the temperature of the discharge air for cooperating in controlling said first motor in a manner to prevent the discharge air temperature from falling too low, and switching means for actuating said second motor to restrict the flow of fresh air and to render said discharge thermostatic means operative to control said first motor when said switching means is in one position, and to permit actuation of said second motor for increasing the flow of fresh air and to vary the control of said discharge thermostatic means upon said first motor when said switching means is in another position.

7. In an air conditioning system, in combination, means for supplying fresh air to a space to be conditioned, means for conditioning the supply of fresh air, a first motor for controlling said conditioning means, a flow controller for varying the supply of fresh air, a second motor for positioning said flow controller, thermostatic means including a control device for controlling said first motor in accordance with the condition of the space, condition responsive means for controlling said second motor, and two-position switching means controlled by said space thermostatic means and separate from said control device for placing said second motor under the control of said condition responsive means when the switching means is in one position and for causing said second motor to reduce the flow of air to a predetermined amount when said switching means is in another position.

8. In an air conditioning system, in combination, means for supplying fresh air to a space to be conditioned, means for heating the supply of fresh air, a first motor for controlling the heating means, a flow controller for controlling the supply of fresh air, a second motor for actuating the flow controller, thermostatic means influenced by space temperature for controlling said first and second motors in a manner to reduce the supply of fresh air and to increase the effect of said heating means upon fall in space temperature, discharge temperature responsive means for cooperating in controlling said first and second motors in a manner to prevent the temperature of the air discharged to said space from falling below a predetermined value, and means actuated in accordance with said flow controller for varying the setting of said discharge temperature responsive means in accordance with the amount of fresh air being supplied to said conditioning system.

9. In an air conditioning system for a space, in combination, a conditioning chamber, means for passing air through said chamber and discharging it into said space, means for supplying fresh air to said chamber, flow control means for controlling the flow of fresh air, heating means for heating the air as it flows through the chamber, space thermostatic means responsive to the demand for heat in said space for controlling said heating means in a manner to maintain a desired temperature in said space, a thermostat responsive to the temperature of the air discharged to said space connected to said flow control means, a relay in the connections between the discharge thermostat and said flow control means and adapted in a first position to render the discharge thermostat operative to control said flow control means and in a second position to place said discharge thermostat out of control of said flow control means and to cause said flow control means to reduce the flow of fresh air to at least a minimum, and control means for causing said relay to shift from its first position to its second position when operation of the heating means becomes unnecessary.

10. In an air conditioning system for a space, in combination, a conditioning chamber, means for passing air through said chamber and discharging it into said space, means for supplying fresh air to said chamber, flow control means for controlling the flow of fresh air, heating means for heating the air as it flows through the chamber, space thermostatic means responsive to the demand for heat in said space for controlling said heating means in a manner to maintain a desired temperature in said space, a thermostat responsive to the temperature of the air discharged to said space connected to said flow control means, a relay in the connections between the discharge thermostat and said flow control means and adapted in a first position to render the discharge thermostat operative to control said flow control means and in a second position to place said discharge thermostat out of control of said flow control means and to cause said flow control means to reduce the flow of fresh air to at least a minimum, and control means actuated by said space thermostatic means for controlling said relay in a manner to cause it to assume its first position when space temperature rises to a value requiring cooling and for causing it to assume its second position when the space temperature falls to a lower value.

11. In an air conditioning system for a space, in combination, a conditioning chamber, means for passing air through said chamber and discharging it into said space, means for supplying fresh air to said chamber, flow control means for controlling the flow of fresh air, heating means for heating the air as it flows through the chamber, space thermostatic means responsive to the demand for heat in said space for controlling said heating means in a manner to maintain a desired temperature in said space, a thermostat responsive to the temperature of the air discharged to said space connected to said flow control means, a two-position control device in the connections between the discharge thermostat and said flow control means and adapted in a first position to render the discharge thermostat operative to control said flow control means and in a second position to place said discharge thermostat out of control of said flow control means and to cause said flow control means to reduce the flow of fresh air to at least a minimum, and means for causing said control device to assume its second position when the heating means is placed into operation and for causing said control device to assume its first position when the heating means is placed out of operation.

12. In a system of the class described, in combination, a heating means, means for passing air into contact with said heating means and for discharging it into a space to be heated, variable impedance means responsive to the temperature of the air in said space for controlling said heating means in a modulating manner, a first low limit variable impedance controller responsive to the temperature of the discharge air for additionally modulatingly controlling said heating means in a manner to increase the heating effect thereof independently of space temperature responsive means when the temperature of said discharge air falls below a first predetermined value, a second low limit variable impedance controller responsive to the temperature of the discharge air for modulatingly increasing the heating effect of the heating means independently of said space temperature responsive means when the temperature falls to a predetermined lower value, and means responsive to a predetermined high space temperature for rendering said first controller incapable of increasing the heating effect when the temperature of said discharge air drops to said first predetermined value.

13. In a system of the class described, in combination, a heating means, means for passing air into contact with said heating means and for discharging it into a space to be heated, a first variable impedance controller influenced by the temperature of the air being discharged to said space for modulatingly controlling said heating means in a manner to prevent the temperature of the discharge air from falling below a predetermined value, a second variable impedance controller influenced by said discharge air for increasing the heating effect of said heating means when the temperature of the discharge air enters a predetermined lower range of values, and space temperature responsive means for interrupting the control of said heating means by one of said controllers when the space temperature assumes a predetermined value.

14. In a system of the class described, in combination, a heating means, means for passing air into contact with said heating means and for discharging it into a space to be heated, variable impedance means responsive to the temperature of the air in said space for modulatingly controlling said heating means in a manner tending to maintain a constant space temperature, low limit variable impedance means responsive to the temperature of the discharge air for modulatingly controlling said heating means in a manner to increase the heating effect thereof independently of the space temperature responsive means to thereby prevent the temperature of said discharge air from falling below the setting of said discharge air temperature responsive means, and means responsive to space temperature for varying the setting of said variable impedance discharge air temperature responsive means in accordance with variations in space temperature.

15. In an air conditioning system, in combination, means for supplying fresh air to a space to be conditioned, flow control means for controlling the supply of fresh air, a condition changer for changing the condition of the air, a first motor for controlling said condition changer, condition responsive means located at the discharge of the conditioning system influenced by the condition of the air passing to said space for controlling said first motor, a second motor for actuating the flow control means, and means actuated in accordance with the operation of said second motor for varying the setting of said condition responsive means.

16. In an air conditioning system, in combination, means for supplying fresh air to a space to be conditioned, flow control means for controlling the supply of fresh air, a condition changer for changing the condition of the air, a first motor for controlling said condition changer, a condition responsive device located at the discharge of the conditioning system influenced by the condition of the air passing to said space for controlling said first motor, a second motor for actuating the flow control means, and means actuated in accordance with the operation of said second motor for cooperating with said condition responsive device in controlling said condition changer.

17. In an air conditioning system, in combination, means for supplying fresh air to a space to be conditioned, flow control means for controlling the supply of fresh air, a condition changer for changing the condition of the air, a first motor for controlling said condition changer, a condition responsive device located at the discharge of the conditioning system influenced by the condition of the air passing to said space for controlling said first motor, a second motor for actuating the flow control means, and means actuated in accordance with the operation of said second motor for placing said condition responsive device into and out of control relationship with said condition changer.

18. In an air conditioning system, in combination, means for supplying fresh air to a space to be conditioned, flow control means for controlling the supply of fresh air, a condition changer for changing the condition of the air, a first motor for controlling said condition changer, a first condition responsive device for controlling said first motor, a second condition responsive device for controlling said first motor, a second motor for actuating the flow control means, and means actuated in accordance with the operation of said second motor for interrupting the control of said condition changer by one of said condition responsive devices.

19. In an air conditioning system, in combination, means for supplying fresh air to a space to be conditioned, flow control means for controlling the supply of fresh air, heating means for heating said air, a first motor for controlling said heating means, temperature responsive means influenced by the heating means for controlling said first motor, a second motor for actuating the flow control means, and means actuated in accordance with the operation of said second motor for controlling said temperature responsive means in a manner to vary the temperature maintained by said temperature responsive means in accordance with the action of said second motor.

20. In an air conditioning system, in combination, means for supplying fresh air to a space to be conditioned, flow control means for controlling the supply of fresh air, heating means for heating said air, a first motor for controlling said heating means, a controller located at the discharge of the conditioning system influenced by the temperature of the air passing to said space for controlling said first motor, a second motor for actuating the flow control means, and means actuated by said second motor for placing said controller into or out of operation.

21. In an air conditioning system, in combination, means for supplying fresh air to a space to be conditioned, flow control means for controlling the supply of fresh air, heating means for heating said air, a first motor for controlling said heating means, a first temperature controller influenced by the temperature of the air passing to said space for controlling said first motor and hence said heating means in a manner to maintain the temperature of the air passing to said space above a predetermined value, a second temperature responsive controller influenced by the air passing to said space for controlling said first motor and hence said heating means in a manner to maintain the temperature of the air passing to said space above a predetermined lower value, a second motor for actuating the flow control means, and means actuated in accordance with the operation of said second motor for interrupting the control of said heating means by said first controller when said flow of fresh air is above a predetermined amount.

WILLIAM L. McGRATH.